United States Patent [19]

Zecher et al.

[11] Patent Number: 4,600,729

[45] Date of Patent: Jul. 15, 1986

[54] PROCESS FOR THE PREPARATION OF ALIPHATIC-AROMATIC POLY-AMIDE-IMIDES IN THE ABSENCE OF PHENOLS

[75] Inventors: Wilfried Zecher, Leverkusen; Klaus Reinking, Wermelskirchen, both of Fed. Rep. of Germany

[73] Assignee: Bayer Aktiengesellschaft, Leverkusen, Fed. Rep. of Germany

[21] Appl. No.: 703,094

[22] Filed: Feb. 19, 1985

[30] Foreign Application Priority Data

Feb. 28, 1984 [DE] Fed. Rep. of Germany ....... 3407201

[51] Int. Cl.$^4$ .............................................. C08G 18/14

[52] U.S. Cl. ................................... 521/128; 521/163; 524/718; 528/49; 528/52; 528/73

[58] Field of Search ............................ 528/49, 52, 73; 521/128, 163; 524/718

[56] References Cited

U.S. PATENT DOCUMENTS

| | | | |
|---|---|---|---|
| 3,658,773 | 4/1972 | Zecher et al. | 528/48 |
| 3,752,791 | 8/1973 | Zecher et al. | 524/743 |
| 3,758,434 | 9/1973 | Kunyel et al. | 524/743 |

Primary Examiner—Maurice J. Welsh
Attorney, Agent, or Firm—Connolly and Hutz

[57] ABSTRACT

The invention relates to a process for the preparation of aliphatic-aromatic polyamide-imides in the absence of phenols.

2 Claims, No Drawings

PROCESS FOR THE PREPARATION OF ALIPHATIC-AROMATIC POLY-AMIDE-IMIDES IN THE ABSENCE OF PHENOLS

It is known that aliphatic-aromatic polyamide-imides are obtained by reacting isocyanates with lactams and/or polyamides and cyclic polycarboxylic acid anhydrides (German Patent Specifications Nos. 1,770,202 and 1,956,512). The reaction is in general carried out in phenolic solvents, for example technical grade cresol mixtures. Aliphatic-aromatic polyamide-imides have recently found use in industry, in particular in the electrical insulation sector, as plastics which are stable towards changes in temperature.

It has now been found that aliphatic-aromatic polyamide-imides can be prepared without using phenols if lactams are employed in excess.

The invention thus relates to a process for the preparation of aliphatic-aromatic polyamide-imides from organic polyisocyanates and polycarboxylic acid anhydrides and, if appropriate, polyamides, characterised in that lactams are used as the reaction medium.

In the reaction according to the invention, the lactams as the reaction medium have the function of a reaction component and of a solvent. Surprisingly, in spite of the high stoichiometric excess of a few hundred mole per cent, the lactam is incorporated into the polyamide-imide in a proportion of only about 20–120 mole per cent, based on the imide groups, depending on the reaction conditions. Even at reaction temperatures above 200° C., the polymerisation to be expected of the lactam is in general only insignificant.

The reaction products, that is to say the aliphatic-aromatic polyamide-imides dissolved in the lactams, can be further processed in this form and, for example, stoved to give lacquer films. The use of phenolic solvents necessary in the established industrial process is thus avoided. On precipitation, polyamide-imides which are free from phenols are obtained and, for example, these can be applied as lacquers from suitable solvents or can be pressed to shaped articles.

The reaction is carried out at a temperature of 0° to 400° C., preferably 30° to 250° C.

Polyisocyanates such as are described, for example, in DE-OS (German Published Specification) No. 1,770,202 can preferably be used for the reaction according to the invention.

Substances which are particularly preferred are phosgenated condensates of aniline and formaldehyde with polyphenylene-methylene structures, technical grade mixtures of toluylene diisocyanates, m-phenylene diisocyanate and symmetric compounds, such as 4,4'-diisocyanato-diphenylmethane, 4,4'-diisocyanato-diphenylether, naphthylene 1,5-diisocyanate, p-phenylene diisocyanate, 4,4'-diisocyanato-diphenyl-dimethylmethane, analagous hydro-aromatic diisocyanates, such as 4,4'-diisocyanato-dicyclohexylmethane, and aliphatic diisocyanates with 2-12C atoms, such as hexamethylene diisocyanate and diisocyanates derived from isophorone, and mixtures thereof.

Instead of the isocyanates, it is also possible to use compounds which react as isocyanates under the reaction conditions, preferably the addition compounds of alcohols and lactams, for example of alcohol mixtures and caprolactam or of mixtures of the amines corresponding to the isocyanates and aliphatic and aromatic carbonic acid esters, for example diethyl carbonate, diphenyl carbonate and ethylene carbonate, which can also already be partly reacted with one another, or polycarbodiimides and isocyanato-isocyanurates from the polyisocyanates described.

Monofunctional isocyanates, such as, for example, phenyl isocyanate, tolyl isocyanate, cyclohexyl isocyanate, stearyl isocyanate, ω,ω,ω-trifluoroethyl isocyanate and 3,5-trifluoromethyl-phenyl isocyanate or the corresponding amines, can also be used to regulate the molecular weight.

Acid anhydrides which can be used for the reaction according to the invention are cyclic polycarboxylic acid anhydrides, such as are described in DE-OS (German Published Specification) No. 170,202 and DE-OS (German Published Specification) No. 2,542,706, preferably polycarboxylic acid anhydrides of the general formula (I)

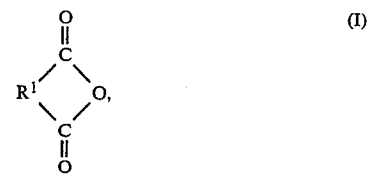

in which $R^1$ denotes an optionally substituted aliphatic $C_2$–$C_{20}$ radical, cycloaliphatic $C_5$–$C_{10}$ radical, an aliphatic-aromatic radical with 1 to 10C atoms in the aliphatic part and 6 to 10C atoms in the aromatic part or an aromatic radical with 6 to 10C atoms, which, in addition to the cyclic anhydride group, carries at least one other cyclic anhydride group or a carboxyl group.

Examples which may be mentioned are butanetetracarboxylic acid dianhydride, cyclopentanetetracarboxylic acid dianhydride, pyromellitic acid dianhydride, benzophenonetetracarboxylic acid dianhydride and, particularly preferably, trimellitic acid anhydride.

Instead of the carboxylic acid anhydrides, it is also possible to use derivatives, such as the alkyl esters or phenyl esters, or the polycarboxylic acids themselves, which are converted into the acid anhydrides in the course of the reaction.

Carboxylic acids which react monofunctionally under the reaction conditions, such as, for example, phthalic acid or its anhydride, benzoic acid or palmitic acid, and which can furthermore be substituted by alkyl or halogen, such as fluorine or chlorine, are used to regulate the molecular weight.

Examples of suitable lactams for the process according to the invention are those of the general formula (II)

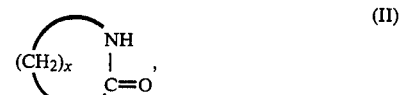

in which x denotes an integer from 2 to 20, preferably from 5 to 11.

Caprolactam is preferably employed.

Polyamides such as are described in DE-AS (German Published Specification) No. 1,956,512, for example polycaproamide (Nylon 6), polydodecanoic acid amide and polyamides of dicarboxylic acids, such as, for example, adipic acid, sebacic acid, oxalic acid, dibutylmalonic acid, isophthalic acid and terephthalic acid, and diamines, such as ethylenediamine, hexamethylenediamine, decamethylenediamines and m- and p-phenylenediamine, can be used in combination with the lactams. Polycaproamide (Nylon 6) and polyhexamethyleneadipamide (Nylon 66) are preferably used.

The polyamide-imides prepared according to the invention can be identified by their IR spectra, in which the characteristic bands for amides and imides appear.

The higher molecular weight amide-imides exhibit a solution viscosity of 200-200,000 mPas, preferably 1,000 to 50,000 mPas, determined on a 30% strength solution in dimethylformamide or cresol at 25° C.

For carrying out the reaction according to the invention, the components are kept at temperatures of 0°–400° C. for a few minutes up to several hours. The end of the reaction manifests itself by the subsidence of the evolution of gas and the increase in viscosity. It is sometimes advantageous to carry out the reaction in several stages or to add the individual components in a different sequence or at various temperatures. Thus, for example, some or all of the acid anhydride or isocyanate can be heated to temperatures up to 200° C. with the lactam and, after cooling and after introduction of the remaining components, the reaction can be carried out in the customary manner. It is furthermore possible, for example, to prepare an adduct or condensate in a first stage, which is then converted into the high molecular weight condensation product at elevated temperatures, for example after application, on a metal sheet or a wire, if necessary after precipitation and, if appropriate, resolution. Suitable precipitating agents are methanol and water. A further embodiment comprises preparing a precondensate in a first stage and then concentrating the polymer and bringing the condensation reaction to completion in an evaporation extruder optionally in vacuo. The amount of lactam incorporated into the polyamide is increased by increasing the temperature and the reaction time.

In some cases, it is advisable to carry out the reaction under an inert protective gas, such as nitrogen or argon. The reaction can be carried out by a continuous or discontinuous procedure.

In general, one equivalent of carboxylic acid or cyclic carboxylic acid anhydride per equivalent of isocyanate and, if appropriate, 0.3–3 equivalents of a polyamide per equivalent of carboxylic acid anhydride are reacted, but substantial deviations from these proportions are also possible.

The lactam is in general employed such that an amount of 5–90% by weight, preferably 15–75% by weight, based on the sum of acid anhydride and lactam, results.

The condensation products can furthermore be modified by also using and incorporating, for example, polyols, polycarboxylic acids and polyamides, polyhydantoines, polycarboxamide esters, polyesters and polyethers. Examples which may be mentioned are ethylene glycol, isophthalic acid and trimesic acid, hexamethylolmelamine, polyalkoxymethylene-melamines, polyesters of terephthalic acid, ethylene glycol and glycerol and polyhydantoines of bisglycine esters and isocyanates.

The reaction according to the invention can be influenced by catalysts, for example by amines, such as triethylamine, 1,4-diazabicyclo-(2,2,2)octane, 4-dimethylaminopyridine, 4-pyrrolo-(1)-hydrin, N-ethyl-morpholine and N-methylimidazole, and by organic and inorganic metal compounds, in particular of iron, lead, zinc, tin, copper, cobalt and titanium, such as iron-III chloride, cobalt acetate, lead oxide, lead acetate, tin octoate, dibutyltin dilaurate, copper acetyl-acetonate, titaniumtetrabutylate, alkali metal phenolates and sodium cyanide, and by phosphorous compounds, such as trialkylphosphine and methylphospholine oxide.

The polyamide-imides according to the invention are distinguished by a particularly high stability towards changes in temperature and are suitable as adhesives, lacquers, films and shaped articles. Their properties can be varied within wide limits for the various fields of use by addition of fillers, pigments and low and high molecular weight components.

EXAMPLE 1

750 g. of 4,4'-diisocyanatodiphenyl methane are added in portions, according to the exothermic reaction, to 1,740 g of caprolactam at 120° C., and 576 g of trimellitic acid anhydride are then introduced. The mixture is then heated up and stirred for in each case 2 hours at 160°, 70°, 190°, 205° and 220° C. Condensation to give the polyamide-imide is effected with carbon dioxide being split off. 725 g of caprolactam are then distilled off under 100 mbar. The reaction product is obtained as a clear melt which has a solids content of about 70% by weight and solidifies to a brittle resin on cooling. The IR spectrum contains the bands characteristic of imides at 1715 and 1775 cm$^{-1}$. The viscosity $\eta^{25}$ of a 15% strength solution of the polyamide-imide in cresol is 860 mPas. 3%, based on the solids content, of dodecanelactam is added to a sample of the resin and the mixture is evaporated in a stream of nitrogen at 300° to 320° C. A clear elastic resin which can still be shaped when hot is obtained.

A 15% strength solution of the polyamide-imide in cresol is brushed onto a glass plate and stoved for in each case 15 minutes at 200° and 300° C. to give a clear elastic film.

A sample of 15% strength solution in cresol is stirred into methanol. The polyamide-imide is obtained as a yellow powder. Analysis shows a nitrogen content of 9.0%, corresponding to an amount of 1 mole of incorporated caprolactam per mole of trimellitic acid anhydride.

EXAMPLE 2

250 g of 4,4'-diisocyanatodiphenylmethane and 192 g of trimellitic acid anhydride are introduced into 580 g of caprolactam at 120°–130° C. The temperature is then increased and the condensation is carried out for in each case 2 hours at 160°, 170° and 190° C. 225 g of caprolactam are then distilled off at about 200° C. in vacuo.

A brittle resin with the characteristic bands of imido in the IR spectrum at 1715 and 1775 cm$^{-1}$ is obtained. Precipitation of a solution of the resin in cresol with methanol gives the polyamide-imide as a yellow powder with a nitrogen content of 8.5%, corresponding to 0.55 mole of incorporated caprolactam per mole of trimellitic acid anhydride.

EXAMPLE 3

174 g of a technical grade mixture of 80% of toluylene 2,4-diisocyanate and 20% of toluylene 2,6-diisocyanate and 192 g of trimellic acid anhydride are introduced into 500 g of caprolactam. The reaction mixture is then heated up and stirred for in each case 2 hours at 160°, 170° and 190° C. and for 4 hours at 205° C. About 210 g of caprolactam are then distilled off in vacuo at temperatures of about 200° C. The polyamide-imide is obtained as a 70% strength clear melt, which solidifies to a brittle resin on cooling. The viscosity $\eta^{25}$ of a 15% strength solution in cresol is 500 mPas.

A sample of the resin is evaporated to a clear hard resin in vacuo at 300° C.

EXAMPLE 4

16.8 g of hexamethylene diisocyanate, 100 g of 4,4'-diisocyanato-diphenylmethane and 96 g of trimellitic acid anhydride are introduced into 525 g of caprolactam at 120° C. The condensation is then carried out, with stirring, for in each case 2 hours at 150°, 170°, 190° and 200° C. and for 4 hours at 220° C. The approximately 33% strength melt of the polyamide-imide solidifies to a brittle mass on cooling. The IR spectrum contains the bands characteristic of an imide at 1710 and 1775 cm$^{-1}$.

A sample of the resin is precipitated from the melt with water. The polyamide-imide is obtained as a yellow powder with a nitrogen content, determined by the Kjeldahl method, of 9.12%. A solution of the polymer in cresol is brushed onto a glass plate and stoved for in each case 15 minutes at 200° and 300° C., to give a clear elastic lacquer film.

EXAMPLE 5

35 g of a technical grade mixture of 80% of toluylene 2,4- diisocyanate and 20% of toluylene 2,6-diisocyanate, 200 g of 4,4'-diisocyanato-diphenylmethane and 192 g of trimellitic acid anhydride are reacted in 565 g of caprolactam, with stirring, for in each case 2 hours at 150°, 170° and 190° C. and for 4 hours at 215° C. The mixture is then diluted with 450 g of caprolactam. An approximately 33% strength solution of the polyamide-imide is obtained, which solidifies to a brittle resin on cooling. The viscosity of a 15% strength solution of the resin, based on the solids content in cresol, is $\eta^{25}=1060$ mPas. A sample of the resin is precipitated as a yellow powder with methanol and dissolved in cresol and the solution is stoved on a glass plate for in each case 15 minutes at 200° and 300° C. to give a clear elastic film.

EXAMPLE 6

255 g of 4,4'-diisocyanato-diphenylmethane and 192 g of trimellitic acid anhydride are introduced into a melt of 1070 g of caprolactam and 39 g of dodecanelactam at 120° C. The mixture is then stirred for in each case 2 hours at 150°, 170°, 190°, 200°, 210° and 200° C. The reaction product solidifies to a brittle mass on cooling. The polyamide-imide content is about 33% by weight. The viscosity of a 15% strength solution in cresol is $\eta^{25}=2460$. 2% of a technical grade mixture of isomeric nonylphenols is added to a sample of the resin, and the sample is evaporated in a stream of nitrogen at 300°–310° C. to give a clear elastic polymer.

EXAMPLE 7

125 g of 4,4'-diisocyanatodiphenylmethane and 96 g of trimellitic acid anhydride are introduced into a mixture of 235 g of caprolactam and 57 g of polycaproamide (Nylon 6) at 120° C. Condensation to the polyamide-imide is carried out, with stirring, for in each case 2 hours at 150°, 170°, 190°, 200°, 210° and 220° C. The mixture is then diluted with 230 g of caprolactam to a solids content of about 33% by weight. The solution is poured out and solidifies to a brittle mass on cooling. The viscosity of 15% strength solution in cresol is $\eta^{25}=2180$. A solution of the resin in cresol is brushed onto a glass plate and is stoved for in each case 15 minutes at 200° and 300° C. to give a clear elastic film. Precipitation of the resin from a solution in cresol with methanol gives the polyamide-imide as a yellow powder, which can be melted and shaped at 300° C.

We claim:

1. Process for the preparation of aliphatic-aromatic polyamide-imides from organic polyisocyanates and polycarboxylic acid anhydrides characterized in that lactams of the formula

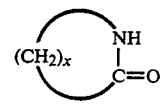

are used as the reaction medium and solvent wherein x denotes an integer from 2 to 20.

2. Lacquers, films, foams or shaped articles which are stable towards changes in temperature which comprise the polyamide-imides obtained in the process according to claim 1.

* * * * *